United States Patent [19]

Moench et al.

[11] Patent Number: 5,225,088
[45] Date of Patent: Jul. 6, 1993

[54] USE OF NONHYDROLYZED COPOLYMERS CONTAINING N-VINYLFORMAMIDE UNITS AS FLOCCULANTS AND DRAINAGE AIDS

[75] Inventors: Dietmar Moench, Weinheim; Heinrich Hartmann, Limburgerhof; Karl-Heinz Buechner, Altlussheim, all of Fed. Rep. of Germany

[73] Assignee: BASF Aktiengesellschaft, Ludwigshafen, Fed. Rep. of Germany

[21] Appl. No.: 762,020

[22] PCT Filed: Mar. 14, 1990

[86] PCT No.: PCT/EP90/00410

§ 371 Date: Sep. 18, 1991

§ 102(e) Date: Sep. 18, 1991

[87] PCT Pub. No.: WO90/11253

PCT Pub. Date: Oct. 4, 1990

[30] Foreign Application Priority Data

Mar. 18, 1989 [DE] Fed. Rep. of Germany ....... 3909005

[51] Int. Cl.$^5$ .......................... C02F 1/56; C02F 11/14
[52] U.S. Cl. .................................... 210/734; 210/735
[58] Field of Search ............... 210/609, 725, 727, 728, 210/734, 735

[56] References Cited

U.S. PATENT DOCUMENTS

| 3,461,163 | 8/1969 | Boothe | 210/735 |
| 4,141,827 | 2/1979 | Coscia et al. | 210/737 |
| 4,421,602 | 12/1983 | Brunnmueller et al. | 162/168.2 |
| 4,444,667 | 4/1984 | Burkert et al. | 210/735 |
| 4,455,047 | 6/1984 | Becker et al. | 210/734 |
| 4,721,574 | 1/1988 | McGrow | 210/734 |
| 4,772,359 | 9/1988 | Linhart et al. | 162/163 |
| 4,789,485 | 12/1988 | Field et al. | 210/727 |
| 4,824,913 | 4/1989 | Murao et al. | 525/344 |
| 4,956,399 | 9/1990 | Kozakiewicz et al. | 210/734 |

FOREIGN PATENT DOCUMENTS

| 0220603 | 5/1987 | European Pat. Off. . |
| 0251182 | 1/1988 | European Pat. Off. . |
| 61-118406 | 6/1986 | Japan . |

*Primary Examiner*—Peter Hruskoci
*Attorney, Agent, or Firm*—Oblon, Spivak, McClellan, Maier & Neustadt

[57] ABSTRACT

Nonhydrolyzed copolymers of
(a) from 99 to 1 mol % of N-vinylformamide and
(b) from 1 to 99 mol % of one or more water-soluble dialkylaminoalkylacrylamides in the form of the salts or quaternized products or a dialkylammonium compound are used as agents for the treatment of wastewaters and sludges.

6 Claims, No Drawings

USE OF NONHYDROLYZED COPOLYMERS CONTAINING N-VINYLFORMAMIDE UNITS AS FLOCCULANTS AND DRAINAGE AIDS

The present invention relates to the use of copolymers containing copolymerized N-vinylformamide units as flocculants and dewatering agents for the treatment of wastewaters and sludges.

JP-A-118 406/86 discloses water-soluble polyvinylamines which are prepared by polymerizing N-vinylformamide or mixtures of N-vinylformamide with other water-soluble monomers, such as acrylamide, N,N-dialkylacrylamides or diallyldialkylammonium salts and then hydrolyzing the polymers with a base, for example ethylamine, diethylamine, ethylenediamine or morpholine. The polyvinylamines are used as drainage aids and retention aids in papermaking and as flocculants for wastewaters.

U.S. Pat. No. 4,421,602 discloses polymers which are obtainable by partial hydrolysis of poly-N-vinylformamide with acids or bases. As a result of hydrolysis, these polymers contain vinylamine and N-vinylformamide units. They are used, for example, as drainage aids, flocculants and retention aids in papermaking. According to U.S. Pat. No. 4,444,667, partially hydrolyzed poly-N-vinylformamides are used as flocculants for sludges.

EP-A-0 220 603 discloses, inter alia, that N-vinylformamide can be subjected to copolymerization together with basic acrylates, such as dimethylaminoethyl acrylate, or N-vinylimidazolines, in supercritical carbon dioxide. The resulting finely divided copolymers are used, in partially hydrolyzed form, in which they contain vinylamine units, for example as retention aids and flocculants in papermaking and as flocculants for sludges.

It is an object of the present invention to provide flocculants and dewatering agents which as far as possible are more effective than those known to date and are industrially more readily obtainable.

We have found that this object is achieved, according to the invention, by the use of nonhydrolyzed copolymers which contain, as copolymerized units, (a) from 99 to 1 mol % of N-vinylformamide and
(b) from 1 to 99 mol % of one or more water-soluble basic monomers of the formula

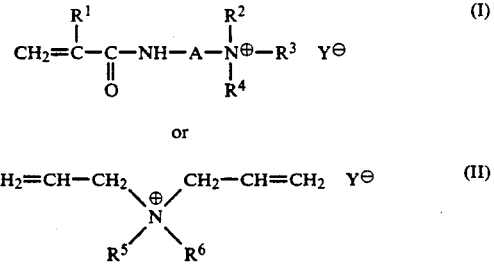

where $R^1$ is H, $CH_3$, $C_2H_5$, $R^2$, $R^3$ and $R^4$ are each H, $CH_3$, $C_2H_5$ or $(—CH_2—CH_2—O—)_nH$, $R^5$ and $R^6$ are each $C_1-C_{10}$-alkyl, A is $C_1-C_6$-alkylene, n is from 1 to 6 and $Y^\ominus$ is an anion, as flocculants for wastewaters and dewatering agents for sludges.

The advantage of the nonhydrolyzed copolymers containing N-vinylformamide units over the hydrolyzed copolymers used to date, which contain vinylamine units after hydrolysis, is that the hydrolysis, which is difficult to carry out in many cases, is dispensed with and effective assistants for the abovementioned applications are obtainable by direct copolymerization.

A suitable monomer (a) of the copolymers is N-vinylformamide. This monomer is used in the synthesis of the copolymers in an amount of from 1 to 99, preferably from 60 to 95, mol %.

Suitable monomers of group (b) are compounds of the formula I, of which the following compounds may be mentioned by way of example:

N-acrylamidoethyl-N-trimethylammonium chloride,
N-methacrylamidoethyl-N-trimethylammonium chloride,
N-acrylamidoethyl-N-trimethylammonium methosulfate,
N-methacrylamidoethyl-N-trimethylammonium methosulfate,
N-methacrylamidomethyl-N-ethyldimethylammonium ethosulfate,
N-acrylamidoethyl-N-ethyldimethylammonium ethosulfate,
N-acrylamidopropyl-N-trimethylammonium chloride,
N-methacrylamidopropyl-N-trimethylammonium chloride,
N-acrylamidopropyl-N-trimethylammonium methosulfate,
N-methacrylamidopropyl-N-trimethylammonium methosulfate,
N-methacrylamidopropyl-N-ethyldimethylammonium ethosulfate and
N-acrylamidopropyl-N-ethyldimethylammonium ethosulfate.

N-Methacrylamidopropyl-N-trimethylammonium chloride is preferred.

Other suitable monomers of group (b) are the compounds of the formula II. Compounds of this type are, for example, diallyldimethylammonium chloride, diallyldimethylammonium bromide, diallyldiethylammonium chloride and diallyldiethylammonium bromide. Diallyldimethylammonium chloride is preferably used. The anion $Y^\ominus$ is an acid radical and is preferably chloride, bromide, iodide, sulfate, methosulfate or ethosulfate.

Among the monomers of group (b), the compounds of the formula I or II may be used either alone or as a mixture with one another for the synthesis of the copolymers. It is also possible to use a plurality of compounds of the formula I or II in the copolymerization with the monomer (a). The monomers of group (b) are used for the synthesis of the copolymers in an amount of from 99 to 1, preferably from 40 to 5, mol %.

The copolymerization of the monomers (a) and (b) is carried out in aqueous solution in the presence of a polymerization initiator which decomposes into free radicals under the polymerization conditions. Examples of suitable polymerization initiators are hydrogen peroxide, alkali metal and ammonium salts of peroxydisulfuric acid, peroxides, hydroperoxides, redox catalysts and in particular nonoxidizing initiators, such as azo compounds which decompose into free radicals. Water-soluble azo compounds, such as 2,2'-azobis-(2-amidinopropane) dihydrochloride, 2,2'-azobis-(N,N,-dimethylene-isobutyramidine) dihydrochloride or 2,2'-azobis-[2-methyl-N-(2-hydroxyethyl)propionamide], are preferably used. The polymerization initiators are employed in conventional amounts, for example in amounts of from 0.01 to 5.0% by weight, based on the monomers to be polymerized. The polymerization can be carried out in a wide temperature range, if necessary under reduced or superatmospheric pressure in appropriately designed apparatuses. The polymerization is preferably carried out at atmospheric pressure and at not more than 100° C, in particular from 30° to 80° C. The concentration of the monomers in the aqueous solution is preferably chosen so that polymer solutions whose solids content is from 10 to 90, preferably from 20 to 70%, by weight are obtained. The pH of the reaction mixture is brought to 4–10, preferably 5–8.

Depending on the polymerization conditions, copolymers having different molecular weights are obtained. To characterize the copolymers, the K value according to H. Fikentscher is used instead of the molecular weight. The K values (measured in 5% strength aqueous sodium chloride solution at 25° C. and at a polymer concentration of 0.1% by weight) are from 80 to 350. Copolymers having low molecular weights and correspondingly low K values are obtained by the conventional methods, i.e. the use of large amounts of peroxide in the copolymerization or of polymerization regulators or combinations of the two stated measures. Polymers having a high K value and a high molecular weight are obtained, for example, by polymerizing the monomers by reverse suspension polymerization or by polymerizing the monomers (a) and (b) by the water-in-oil polymerization process. In the reverse suspension polymerization process and the water-in-oil polymerization process, saturated hydrocarbons, for example hexane, heptane, cyclohexane or decalin, or aromatic hydrocarbons, such as benzene, toluene, xylene or cumene, are used as the oil phase. The ratio of oil phase to aqueous phase in the reverse suspension polymerization is, for example, from 10:1 to 1:10, preferably from 7:1 to 1:1.

To disperse the aqueous monomer solution in an inert hydrophobic liquid, a protective colloid is required, the purpose of which is to stabilize the suspension of the aqueous monomer solution in the inert hydrophobic liquid. The protective colloids furthermore have an effect on the particle size of the polymer beads formed by polymerization.

Examples of suitable protective colloids are the substances described in U.S. Pat. No. 2,982,749. The protective colloids which are disclosed in German Patent 2,634,486 and are obtainable, for example, by reacting oils and/or resins, each of which have allyl hydrogen atoms, with maleic anhydride are also suitable.

Other suitable protective colloids are disclosed in, for example, German Patent 2,710,372 and are obtainable by thermal or free radical solution or mass polymerization of from 60 to 99.9% by weight of dicyclopentadiene, from 0 to 30% by weight of styrene and from 0.1 to 10% by weight of maleic anhydride.

Further suitable protective colloids are graft polymers which are obtainable by grafting polymers (A) of
a) from 40 to 100% by weight of monovinylaromatic monomers,
b) from 0 to 60% by weight of monoethylenically unsaturated carboxylic acids of 3 to 6 carbon atoms, maleic anhydride and/or itaconic anhydride and
c) from 0 to 20% by weight of other monoethylenically unsaturated monomers,
with the proviso that the sum of the percentages by weight (a) to (c) is always 100 and the polymers A) have a number average molecular weight of from 500 to 20,000 and hydrogenation iodine numbers (according to DIN 53,241) of from 1.3 to 51, with monomer mixtures of
1) from 70 to 100% by weight of acrylates and/or methacrylates of monohydric alcohols of 1 to 20 carbon atoms,
2) from 0 to 15% by weight of monoethylenically unsaturated carboxylic acids of 3 to 6 carbon atoms, maleic anhydride and/or itaconic anhydride,
3) from 0 to 10% by weight of monoacrylates and/or monomethacrylates of dihydric or polyhydric alcohols,
4) from 0 to 15% by weight of monovinylaromatic monomers and
5) from 0 to 7.5% by weight of acrylamide and/or methacrylamide, with the proviso that the sum of the percentages by weight a) to e) is always 100, at not more than 150° C. in an inert hydrophobic diluent in the presence of a polymerization initiator, the monomers being used in an amount of from 97.5 to 50% by weight, based on the mixture of polymer (A) and monomers. Protective colloids of this type are described in EP-A-0 290 753.

If an aliphatic hydrocarbon is used as the inert hydrophobic liquid in the reverse suspension polymerization, a mixture of an inorganic suspending agent based on modified finely divided minerals and a nonionic surfactant has proven very advantageous as the protective colloid.

The inorganic suspending agents which have a low hydrophilic-lyophilic balance [sic] are the agents usually used in the reverse suspension polymerization process. The mineral component of these substances is, for example, formed by bentonite, montmorillonite or kaolin. The finely divided minerals are modified by treatment with salts of long-chain amines, for example $C_8$–$C_{24}$-amines, or quaternary ammonium salts, the amine salts or the quaternary ammonium salts being intercalated between the individual layers of the finely divided minerals. The ammonium salts which may be quaternized and used for modification preferably contain 1 or 2 $C_{10}$–$C_{22}$-alkyl radicals. The other substituents of the ammonium salts are $C_1$–$C_4$-alkyl or hydrogen. The content of free ammonium salts of the amine-modified minerals is not more than 2% by weight. Finely divided minerals modified with ammonium salts are commercially avialable.

The inorganic suspending agents for the reverse suspension polymerization include silica which has been reacted with organosilicon compounds. A suitable organosilicon compound is, for example, trimethylsilyl chloride.

The aim of the modification of the inorganic finely divided minerals is to improve the wettability of the minerals with the aliphatic hydrocarbon used as the external phase of the reverse suspension polymerization. In the case of the natural minerals having a layer-like structure, for example bentonite and montmorillonite, modification with amines results in the modified minerals swelling in the aliphatic hydrocarbon and disintegrating into very fine particles. The particle size is about 1 μm, in general from 0.5 to 5 μm. The silicas reacted with organosilicon compounds have a particle size of from about 10 to 40 nm. The modified finely divided minerals are wet both by the aqueous monomer solution and by the solvent and thus accumulate in the phase interface between the aqueous and the organic phase. They prevent coagulation when two aqueous monomer droplets collide in the suspension.

After the end of the copolymerization, some of the water is distilled off azeotropically so that copolymers having a solids content of from 70 to 99, preferably from 80 to 95%, by weight are obtained. The copolymers are in the form of fine beads having a diameter of from 0.05 to 1 mm. Copolymers having K values of from 80 to 250 are preferably used.

In contrast to the prior art, the copolymers described above are used in the nonhydrolyzed form for the treatment of wastewaters from municipal or industrial treatment plants and for the treatment of sludges.

The sludges originating from municipal or industrial wastewater treatment plants are substances which settle out on the bottom of the treatment apparatuses during the treatment of the wastewaters. The solids content of the sludges is from about 2 to 8% by weight. By adding the copolymers to be used according to the invention to the sludges, in particular to sludges from municipal wastewater treatment plants, it is possible to obtain a readily filterable or centrifugable residue having a high solids content of up to about 30% by weight. The flocculants or dewatering agents are used for sludge treatment in an amount of from 50 to 500 g/m$^3$ of sludge. It is necessary for the dewatering agent used to be well distributed in the sludge. This is effected, for example, in a mixing drum.

The flocculation or dewatering effect occurs virtually immediately after addition of the copolymers. An increase in the particle size of the solids to be flocculated is observed. The water is separated from the residue with the aid of conventional apparatuses, such as screen belt presses or centrifuges. The residue can then be deposited on a landfill or incinerated.

The abovementioned nonhydrolyzed copolymers are also used as flocculants for wastewaters from municipal or industrial treatment plants. In general from 10 to 500 g/m$^3$ of wastewater are required for this purpose. The advantage of the nonhydrolyzed copolymers over conventional flocculants is that they lead to the formation of large, stable flocs which are particularly easy to filter.

The K value of the copolymers was determined according to H. Fikentscher, Cellulosechemie 13 (1932), 58–64 and 71–74, at 25° C. in 5% strength aqueous sodium chloride solution and at a polymer concentration of 0.1% by weight; $K = k.10^3$.

The following starting materials were used:

Copolymer 1

Copolymer of 90 mol % of N-vinylformamide (VFA) and 10 mol % of 3-methacrylamidopropyltrimethylammonium chloride (MAPTAC)

Copolymer 1 was prepared by initially taking 800 g of cyclohexane and 3 g of the protective colloid described in Example 1 of EP-A-0 290 753 in a 2 flask which was provided with a stirrer, a thermometer, a gas inlet tube and a reflux condenser. The initially taken mixture was heated to 50° C. under a nitrogen atmosphere and while stirring at a stirrer speed of 300 revolution per minute. As soon as this temperature had been reached, a solution of 117 g of N-vinylformamide, 80 g of a 50% strength by weight aqueous solution of 3-methacrylamidopropyltrimethylammonium chloride, 0.15 g of sodium diethylenetriaminepentaacetate, 0.65 g of 2,2,-azobis-(2-amidinopropane) dihydrochloride and 100 g of water were added in the course of 30 minutes. The pH of the aqueous phase was 6.5. Thereafter, the reaction mixture was stirred for 16 hours at 50° C. The temperature was then increased to 78° C. and 134 g of water was distilled off azeotropically with the aid of a water separator. The white bead-like solid obtained was filtered off, washed with 200 g of cyclohexane and freed from the residual solvent under reduced pressure. 163 g of a copolymer having a solids content of 96.4% by weight were obtained. The K value was 180.

Copolymers 2 to 5, whose composition is shown in Table 1, were prepared similarly to the abovementioned preparation method.

TABLE 1

| Copolymer No. | Mol % VFA[1] | Mol % -MAPTAC[2] | Solids content [%] | K value |
|---|---|---|---|---|
| 2 | 80 | 20 | 96.1 | 180 |
| 3 | 70 | 30 | 91.0 | 203 |
| 4 | 60 | 40 | 94.1 | 189 |
| 5 | 50 | 50 | 88.0 | 200 |

[1]VFA = N-vinylformamide
[2]MAPTAC = 3-Methacrylamidopropyltrimethylammonium chloride The following polymers were used for comparison:

Copolymer 6: Homopolymer of N-vinylformamide having a solids content of 96.6% and a K value of 203 and prepared by a method similar to that for copolymer 1, by homopolymerization of N-vinylformamide.

Copolymer 7: Partially hydrolyzed polymer 6 which was obtained by homopolymerization of N-vinylformamide by the preparation method stated for copolymer 1, except that 105 g of a 38% strength hydrochloric acid were added before removal of the water, and the mixture was stirred for 3 hours at 50° C. before the water was distilled off azeotropically. The degree of hydrolysis was 42%, the K value 185 and the solids content 93.5%.

Copolymer 8: Commercial copolymer of 70% of acrylamide and 30% of dimethylaminoethyl acrylate methochloride, K value 220.

Copolymer 9: Commercial copolymer of 50% of acrylamide and 50% of dimethylaminoethyl acrylate methochloride, K value 213.

Copolymer 10: Commercial copolymer of 20% of acrylamide and 80% of dimethylaminoethyl acrylate methochloride, K value 200.

0.1% strength aqueous solutions were prepared from from each of the copolymers 1 to 10 and were tested as treatment agents for sewage sludge dewatering by the following methods:

a) Determination of the flocculation value and the filtration rate

Certain amounts of a 0.1% strength aqueous solution of a flocculating agent were added to 500 ml of a sewage sludge in a 1 measuring cylinder. Flocculation occurred during mixing. The content of the measuring cylinder was then emptied into a Büchner funnel and filtered. Flocculation is assessed visually from the filter.

Scarcely visible flocculation means flocculation value 1

Slight flocculation means flocculation value 2

Moderate flocculation means flocculation value 3

Good flocculation generally sufficient for practice means flocculation value 4

Very good, optimum flocculation means flocculation value 5.

At the same time, the amount of filtrate was measured after 15, 30, 45 and 60 sec.

b) Flocculation efficiency

In this test, likewise in a 1 measuring cylinder, the amount of flocculant which has to be added to a sludge to achieve optimum flocculation (flocculation value = 5) was determined.

The efficiency of copolymers 1 to 10 in the treatment of digested sludge from a municipal wastewater treatment plant was determined in each case by the test method stated above under a). To achieve a flocculation value of 5, the amount used was 250 mg of copolymer/1 of sludge.

TABLE 2

| Example No. | Comparative Example No. | Copolymer No. | Amount of filtrate in ml after ... sec | | | |
|---|---|---|---|---|---|---|
| | | | 15 | 30 | 45 | 60 |
| 1 | — | 1 | 200 | 290 | 335 | 350 |
| 2 | — | 2 | 205 | 295 | 335 | 355 |
| 3 | — | 3 | 240 | 350 | 380 | 390 |
| 4 | — | 4 | 220 | 315 | 350 | 365 |
| 5 | — | 5 | 210 | 300 | 340 | 350 |
| | 1 | 6 | — | — | — | —* |
| | 2 | 7 | — | — | — | —* |
| | 3 | 8 | 230 | 315 | 355 | 375 |
| | 4 | 9 | 160 | 235 | 280 | 300 |
| | 5 | 10 | 145 | 225 | 270 | 295 |

*The flocculation value of 5 was not achieved with the amount used here

We claim:

1. A process for flocculating wastewaters and dewatering sludges, comprising adding an effective amount of a nonhydrolyzed copolymer which comprises, as copolymerized units, (a) from 99 to 50 mol % of N-vinylformamide and
(b) from 1 to 50 mol % of one or more water-soluble basic monomers of the formula

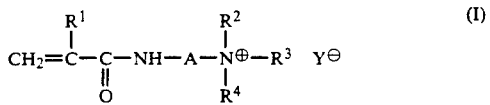

or

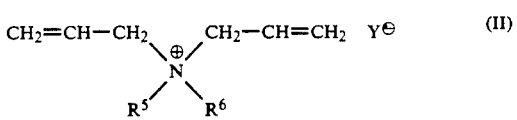

where $R^1$ is H, $CH_3$, $C_2H_5$, $R^2$, $R^3$ and $R^4$ are each H, $CH_3$, $C_2H_5$ or $(-CH_2-CH_2-O-)_nH$, $R^5$ and $R^6$ are each $C_1$-$C_{10}$-alkyl, A is $C_1$-$C_6$-alkylene, n is from 1 to 6 and $Y^\ominus$ is an anion, to the wastewaters or to the sludges to form a flocculated residue, wherein said nonhydrolyzed copolymer has a K value of form 80 to 350 (determined according to H. Fikentscher in 5% strength aqueous sodium chloride solution at 25° C. and at a polymer concentration of 0.1% by weight, and separating water from said residue.

2. The process of claim 1, wherein said nonhydrolyzed copolymer contains, as copolymerized monomer b) 3-methacrylamidopropyltrimethylammonium chloride.

3. The process of claim 1, wherein said nonhydrolyzed copolymer is added in an amount of from 50 to 500 g/m³ of sludge.

4. The process of claim 1, wherein said nonhydrolyzed copolymer is added in an amount of from 10 to 500 g/m³ of wastewater.

5. The process of claim 1, wherein said nonhydrolyzed copolymer contains, as copolymerized monomer b) diallyldimethylammonium chloride.

6. The process of claim 1, wherein said nonhydrolyzed copolymer comprises, as copolymerized units, (a) 60-95 mol % of N-vinylformamide and
(b) 5-40 mol % of one or more water soluble basic monomers of formula (I) or formula (II).

* * * * *